United States Patent [19]

Michizuki et al.

[11] Patent Number: 4,944,881
[45] Date of Patent: Jul. 31, 1990

[54] LIQUID SEPARATION MEMBRANE FOR PERVAPORATION

[75] Inventors: Akira Michizuki; Yoshio Sato; Hisashi Ogawara, all of Kurashiki; Syuzo Yamashita, Kiyoneson, all of Japan

[73] Assignee: Agency of Industrial Science and Technology, Tokyo, Japan

[21] Appl. No.: 277,242

[22] Filed: Nov. 29, 1988

Related U.S. Application Data

[62] Division of Ser. No. 1,727, Jan. 7, 1987, Pat. No. 4,808,313, which is a division of Ser. No. 815,453, Dec. 31, 1985, abandoned.

[30] Foreign Application Priority Data

| Jan. 8, 1985 | [JP] | Japan | 60-443 |
| Jan. 30, 1985 | [JP] | Japan | 60-14503 |
| Mar. 29, 1985 | [JP] | Japan | 60-63429 |

[51] Int. Cl.$^5$ ............................................. B01D 61/36
[52] U.S. Cl. ........................... 210/640; 159/DIG. 27; 203/19
[58] Field of Search ................... 210/638, 640, 500.27, 210/500.28, 500.29; 159/DIG. 27; 203/18, 19

[56] References Cited

U.S. PATENT DOCUMENTS

| 2,953,502 | 4/1960 | Binning et al. | 202/42 |
| 3,959,079 | 5/1976 | Mareschi et al. | 210/656 |
| 4,035,291 | 7/1977 | Chiang et al. | 210/640 |
| 4,067,805 | 1/1978 | Chiang et al. | 210/640 |
| 4,199,445 | 4/1980 | Chiang et al. | 210/640 |
| 4,218,312 | 8/1980 | Perry | 210/640 |
| 4,311,594 | 1/1982 | Perry | 210/640 |
| 4,329,383 | 5/1982 | Joh | 210/500.43 |
| 4,591,440 | 5/1986 | Higashimura et al. | 210/640 |
| 4,663,050 | 5/1987 | Li et al. | 210/640 |

FOREIGN PATENT DOCUMENTS

| 146655 | 7/1985 | European Pat. Off. . |
| 10549 | 2/1979 | Japan . |
| 10548 | 7/1979 | Japan . |
| 49041 | 9/1984 | Japan . |
| 129104 | 7/1985 | Japan . |
| 2150140 | 6/1985 | United Kingdom . |

OTHER PUBLICATIONS

J. of Applied Polymer Science, vol. 26, 3223-3243 (1981).
J. Polymer Sci.: Symposium No. 41, 145-153 (1973).

*Primary Examiner*—Ivars Cintins
*Attorney, Agent, or Firm*—Wenderoth, Lind & Ponack

[57] ABSTRACT

A liquid separation membrane for pervaporation composed of a polymeric substance having in the main chain a glycosidic skeleton containing cationic groups and/or anionic groups at least some of which form a salt with counter anions and/or counter cations; and a method for pervaporation, which comprises separating a water-organic liquid mixture or an organic liquid-organic liquid mixture by pervaporation using a separation membrane, said membrane being composed of a polymeric substance having in the main chain a glycosidic skeleton containing cationic groups and/or anionic groups at least some of which form a salt with counter anions and/or counter cations and being dried so as to have a water content of not more than 25% by weight.

9 Claims, No Drawings

LIQUID SEPARATION MEMBRANE FOR PERVAPORATION

This application is a division of Ser. No. 07/001,727 filed Jan. 7, 1987 now U.S. Pat. No. 4,808,313, which is a division of Ser. No. 06/815,453 filed Dec. 31, 1985, now abandoned.

This invention relates to a liquid separation membrane for use in separating a water-organic liquid mixture or an organic liquid-organic liquid mixture by a pervaporation process, and to a method of separation by pervaporation using the aforesaid membrane.

Heretofore, a method of separating a water-organic liquid mixture by the so-called "pervaporation process" has been employed which comprises feeding the water-organic liquid mixture to be separated into a supply liquid side ("upstream chamber") of two chambers partitioned by a separation membrane, and reducing the pressure of a permeated liquid side ("downstream chamber") or maintaining a low vapor pressure in the downstream chamber by passing an inert gas, and thereby allowing a component having a higher affinity for the membrane to permeate preferentially through the membrane into the downstream chamber as a vapor. Various methods for separating water-organic liquid mixtures by the pervaporation process have been reported. For example, they include the separation of azeotropic liquid mixtures by using a cellulose acetate membrane or a polyvinyl alcohol membrane (U.S. Pat. No. 2,953,502 to Binning et al.); the separation of a water-methanol liquid mixture in the presence of sodium formate using a cellophane membrane [J. Polymer Sci., Symposium No. 41, 145–153 (1973)]; the method of separating a water-methanol liquid mixture using a grafted polyvinyl alcohol membrane [Journal of Applied Polymer Science, vol. 26 (1981), page 3223]; and the separation of water-organic liquid mixtures by using synthetic polymeric membranes containing an ionic group (Japanese Patent Publications Nos. 10548/1979, 10549/1979, and 49041/1984).

Unlike the reverse osmosis process, the pervaporation process is not limited in the concentration of liquid mixtures by the osmotic pressure. Hence, it is not limited to the separation of liquid mixtures of low concentrations, but can be applied to liquid mixtures of all concentration ranges. It also has the advantage of being applicable to the separation of azeotropic mixtures or isomers having close boiling points (for example, an o- and p-isomeric mixture, or a mixture of cis- and trans-isomers) which are difficult to separate by distillation.

The separation membranes used in the conventional pervaporation process, however, have the following problem, and have not yet gained commercial acceptance. Specifically, because the ratio of separation by one passage of a mixture of liquids through a polymeric membrane, i.e. "separation factor $\alpha$", is low, the mixture must be passed through the membrane many times in order to separate or concentrate the components to the desired concentrations, and it is impossible to take full advantage of the membrane separation process. The "separation factor $\alpha$" is the quotient of the weight ratio of component A to component B after passage through the membrane divided by the weight ratio of component A to component B before passage through the membrane, and is generally represented by the following equation.

$$\alpha_B^A = \frac{(W_A/W_B) \text{ of the permeate}}{(W_A/W_B) \text{ of the feed mixture}}$$

wherein
$W_A$ is the weight of component A and
$W_B$ is the weight of component B.

In particular, according to the conventional pervaporation process, the separation factor becomes very low when the permeation rate at which the liquid permeates through the polymeric membrane (generally expressed by the amount of the liquid permeated per unit membrane surface area and per unit time, i.e. "Q" (kg/m$^2$.hr) becomes a high practical value.

All of the conventional separation membranes have a separation factor of several tens, and their separation performance is low. Furthermore, they do not have entirely satisfactory water resistance and mechanical strength.

It is an object of this invention to provide a liquid separation membrane for pervaporation which has a high separation factor at a high permeation rate in the separation of water-organic liquid mixtures or organic liquid-organic liquid mixtures by the pervaporation process.

Another object of this invention is to provide a liquid separation membrane for pervaporation which can be applied to the separation of organic liquid mixtures having a broad concentration range and has excellent physical properties such as water resistance and mechanical strength.

Still another object of this invention is to provide a method of separation by pervaporation by which a water-organic liquid mixture or an organic liquidorganic liquid mixture can be treated at a high permeation rate while maintaining a high separation factor.

Extensive investigations by the present inventors in order to achieve these objects have unexpectedly led to the discovery that a membrane composed of a polymeric substance having an ionized glycosidic skeleton in the backbone chain, which has not previously aroused interest as a separation membrane for pervaporation, is a liquid separation membrane having a very great separating function.

According to this invention, there is provided a liquid separation membrane for pervaporation composed of a polymeric substance having in the main chain a glycosidic skeleton containing cationic groups and/or anionic groups at least some of which form a salt with counter anions and/or counter cations (to be referred to as the "ionized polysaccharide-type membrane").

The "cationic groups" and "anionic groups", used herein, include all cationic and anionic groups capable of forming salts. From a practical viewpoint, preferred anion groups are, for example, sulfuric acid ester residues, a sulfonic acid residue, a carboxylic acid residue, phosphoric acid ester residues, and a phosphonic acid residue. Examples of preferred cationic groups include ammonium groups and metal complex groups having a nitrogen atom coordinated with polyvalent metal ions. The ammonium groups may include ions represented by the general formula -N$^{\oplus}$H$_n$R$_{4-n}$ wherein R represents a hydrocarbon group having 1 to 6 carbon atoms, and n is an integer of 1 to 4; and ammonium groups derived from polyamines such as —NHCH$_2$CH$_2$NH$_2$ and —NHCH$_2$CH$_2$NHCH$_2$CH$_2$NH$_2$, and ammonium groups derived from a nitrogen-containing heterocyclic group such as

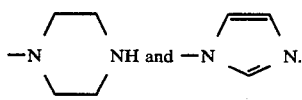

The metal complex groups having a nitrogen atom coordinated with a polyvalent metal ion denote metal complex groups formed by the coordination of the nitrogen atoms on polysaccharide molecules with the polyvalent metal ions, and are represented by the general formula

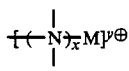

wherein x is the number of nitrogen atoms coordinated with the metal ion and represents an integer of 1 to 6, and y is the valency of a metal ion and represents an integer of 2 to 4, and M represents a metal.

The ionized polysaccharide-type membrane of this invention is based on a polysaccharide having at least one group selected from the aforesaid ionic groups.

Examples of the ionized polysaccharide-type membrane of this invention will be given below. Specific examples of membranes of anionic polysaccharide salts include those composed of anionic polysaccharide salts, for example, salts of natural polysaccharides such as alginic acid, pectic acid, chondroitin sulfate, hyaluronic acid and xanthan gum; salts of derivatives of these natural polysaccharide such as partially methylesterified alginic acid, carbomethoxylated alginic acid, phosphorylated alginic acid and aminated alginic acid; salts of anionic cellulose derivatives such as carboxymethyl cellulose, cellulose sulfate, cellulose phosphate, sulfoethyl cellulose and phosphonoethyl cellulose; and salts of semisynthetic polysaccharides such as guar gum phosphate and chitin phosphate. Specific examples of membranes of cationic polysaccharide salts include those composed of salts of chitosan and its derivatives such as N-acylated chitosan, chitosan phosphate and carbomethoxylated chitosan; salts of aminocellulose or Nsubstituted aminocelluloses such as N-methylaminocellulose, N,N-dimethylaminocellulose, diethylene triaminocellulose and piperazinocellulose; and polysaccharide derivatives containing an amine nitrogen atom such as diethylaminoethyl cellulose, aminoethyl cellulose and cyanuryl chloride cellulose. Of these, membranes composed of salts of alginic acid, salts of alginic acid derivatives, chitosan salts, salts of chitosan derivative, and salts of anionic or cationic cellulose derivatives are preferred in view of their film-formability, mechanical strength and film functions.

The liquid separation membrane of this invention is a membrane composed mainly of an ionized polysaccharide-type polymeric substance exemplified hereinabove, and includes not only membranes composed only of ionized polysaccharides, but also membranes composed of blends of the ionized polysaccharides and other compatible polymeric substances, for example polyvinyl alcohol (PVA) or neutral polysaccharides such as starch and pullulan, and membranes composed of grafted ionized polysaccharides obtained by grafting a hydrophilic vinyl monomer such as acrylic acid.

In the ionized polysaccharide-type membranes of this invention, the cationic groups and/or anionic groups form a salt with counter cations and/or counter anions forming pairs with these groups. When the ionized groups are anionic groups such as sulfate groups, sulfonate groups and phosphonate groups, examples of counter cations to these groups include alkali metals such as lithium, sodium, potassium, rubidium and cesium, alkaline earth metals such as beryllium, magnesium, calcium, strontium and barium, transition metals such as titanium, chromium, manganese, iron, cobalt, nickel, copper, zinc, silver, rhodium, zirconium, cerium and europium; ions of metals belonging to Groups IIIB and IVB of the periodic table such as aluminum, tin and lead; ammonium ions represented by the general formula $N^{\oplus}H_nR_{4-n}$ in which R represents a hydrocarbon group having 1 to 4 carbon atoms and n is an integer of 1 to 4; and ammonium ions and pyridinium ions derived from polyamines such as

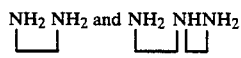

or nitrogen-containing heterocyclic compounds such as

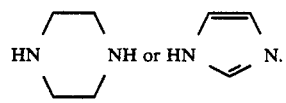

When the ionized groups are ammonium groups, examples of counter anions forming pairs with these groups include halogen ions such as a chlorine ion and a bromine ion, anions generated from inorganic acids such as sulfuric acid, phosphoric acid and nitric acid; and anions generated from organic acids such as formic acid, acetic acid, propionic acid, methanesulfonic acid, oxalic acid, malonic acid, succinic acid, fumaric acid, maleic acid, glutaric acid, phthalic acid, isophthalic acid, terephthalic acid, trimellitic acid, citric acid, pyromellitic acid, ethylenediaminetetraacetic acid and aconitic acid. Examples of counter ions of the metal complex groups having a nitrogen atom coordinated with a polyvalent metal include anions generated from inorganic acids such as sulfuric acid, phosphoric acid, nitric acid and hydrohalic acids; and anions generated from organic acids such as acetic acid. It should be understood that the membranes of this invention may include those which have both a cationic group and an anionic group in the same molecule and in which these groups are intramolecularly and/or intermolecularly ionized by the formation of a salt, or those in which the counter ions are polyions (for example, in the case of an ion complex between alginic acid and polyethyleneimine, an ion complex between chitosan and polyacrylic acid, and an ion complex between alginic acid and chitosan).

It is not necessary that all of the cationic groups and/or anionic groups in the separation membrane form salts with the counter anions and/or counter cations, and some of these groups may be free. Desirably, at least 0.5 mole %, preferably 5 to 100 mole %, more preferably 15 to 100 mole %, of the cationic groups and/or anionic groups form salts with counter anions and/or counter cations, although it differs according to the type of the polysaccharide forming the base of the membrane or the type of the cationic groups and/or anion groups.

To describe the present invention more specifically, the ionization method for the ionized polysaccharide-type membranes of this invention will be described below in detail by taking up alginic acid-type polysaccharide membranes, chitosan-type polysaccharides membranes, and cellulose derivatives as examples. It should be understood however that there is no intention of limiting the scope of the invention by these specific examples.

[A] Alginic acid-type polysaccharide membrane

An alginic acid-type polysaccharide as an example of an anionic polysaccharide-type membrane will be described.

Alginic acid is viscous polyuronic acid extracted from brown marine algae such as kelp. It is a block copolymer composed of M-M blocks of D-mannuronic acid residues (M) of a $\beta$-(1→4) linkage, G-G blocks of L-gluronic acid residues (G) of an $\alpha$-(1→4) linkage and M-G blocks comprising alternately arranged M and G residues. Alginic acid forms a salt with an alkali such as sodium hydroxide and potassium hydroxide and easily dissolves in water. By casting a solution of the alginic acid salt on a flat plate such as a glass plate and allowing it to dry spontaneously, a transparent homogeneous film of the alginate can be formed. Furthermore, when a solution of the alginate salt is contacted with a water-soluble organic solvent such as ethanol, isopropanol or acetone or a concentrated salt solution, the alginate is coagulated and precipitated. By utilizing this property, a wet-coagulated film of the alginate can also be prepared. In ionizing the alginic acid-type polysaccharide membrane (the alginic acid-type polysaccharide denotes alginic acid and its derivatives such as those exemplified hereinabove), ions which can be utilized as counter cations include, for example, the aforesaid metal ions, ammonium ions, and ammonium ions generated from polyamines or amines having a nitrogencontaining heterocyclic structure. At this time, a plurality of kinds of counter cations may be used simultaneously. Suitable ion sources may, for example, include salts or hydroxides of the metals for the metal ions, and ammonium salts or amines for the ammonium ions. An ionized alginic acid-type polysaccharide membrane containing the above-exemplified counter cations may be prepared by immersing an alginic acid-type polysaccharide membrane or an alginic acid-type polysaccharide salt membrane in a solution containing the cations to perform ion exchange, or by subjecting such a membrane to pervaporation using a liquid mixture containing such cations thereby to perform ion-exchange successively.

The suitable content of the counter cations in the membrane of this invention depends upon the type of the counter cations and the liquid mixture to be separated, and may be properly selected according to each particular system employed. For example, when the liquid mixture to be separated is a water-ethanol mixture, the content of the counter cations is one sufficient to ionize at least 2 mole %, preferably 5 to 100 mole %, more preferably 15 to 100 mole %, based on the amount of carboxyl groups present in the alginic acid-polysaccharide.

Since anionic polysaccharide-type membranes including the ionized alginic acid-type polysaccharide membranes, are hydrophilic, the properties of the membranes are greatly affected by the concentration of water when the liquid mixture to be separated is a waterorganic liquid mixture. The suitable concentration of the organic liquid at which the anionic ionized polysaccharide-type membranes exhibit high performance depends upon the type of the membrane, the type of the counter ions, and the type of the organic liquid, and therefore is properly selected according to each particular system employed. For example, in the separation of a water-ethanol mixture by using a membrane made of sodium alginate, it is desirable to perform the separation in an ethanol concentration of at least 70% by weight, preferably at least 85% by weight.

When the alginic acid-type polysaccharide membrane is to be ionized by using as the counter cations at least one type of polyvalent metal ion, for example alkaline earth metals such as calcium, strontium and barium, transition metals such as titanium, chromium, manganese, iron, cobalt, nickel, copper, zinc, silver, zirconium, europium, cerium and rhodium, and metals of Groups IIIB or IVB such as aluminum and tin, crosslinkage takes place simultaneously with the ionization. As a result, the water-resistance of the membrane increases. In particular, when a water-organic liquid mixture is to be treated with this membrane, the range of concentrations of the liquid mixture in which the membrane can be used is broadened as compared with non-crosslinked membranes. In the present invention, it is preferred to form a salt between 9 to 70 mole %, particularly 20 to 60 mole %, of the anionic groups in the membrane with the aforesaid polyvalent metal ions and thus crosslink them. In the separation of an organic liquid mixture using a non-crosslinked membrane, membranes should be selected to suit the concentrations of the organic liquid mixture. But in the case of membranes crosslinked with polyvalent metal ions, a single type of membrane suffices for treating organic liquid mixtures of various concentrations while maintaining a high separation factor and a high permeation rate.

The ratio of "crosslinkage", as used with regard to the membrane of this invention, denotes the proportion (mole %) of carboxyl groups ionically bonded to the crosslinking polyvalent metal ion based on the total amount of the carboxyl groups of alginic acid, when the membrane is of the alginic acid salt type. The ratio of crosslinkage is obtained by measuring the amount of the crosslinking polyvalent metal ions by atomic absorptiometry, and calculating the ratio of crosslinkage by assuming that the carboxyl groups of alginic acid are ionically bonded stoichiometrically to all of the polyvalent metal ions. With regard to other anioic polysaccharide-type membranes, the ratio of crosslinkage can be determined substantially in accordance with the above method.

Crosslinking is desirable in order to increase the water resistance and mechanical strength of the anionic polysaccharide membranes. The crosslinking may be carried out not only by the aforesaid crosslinking method using polyvalent metal ions, but also by a chemical crosslinking method such as a method comprising forming an ester linkage between molecules of the polysaccharide using an organic polybasic acid or a polyhydric alcohol, or a method comprising forming an acetal linkage between molecules of the polysaccharide using an aldehyde, etc. These chemical crosslinking methods may be used singly or in combination with each other, or with the aforesaid crosslinking method using polyvalent metal ions.

The ionizing methods and crosslinking methods can also be applied directly to other anionic polysaccharides.

[B] Chitosan-type polysaccharide membrane.

A chitosan-type polysaccharide membrane as an example of a cationic polysaccharide-type membrane will be described.

The chitosan-type polysaccharide denotes chitosan and the aforesaid derivatives of chitosan. Chitosan is a generic term for deacetylation products of chitin obtained by treatment with concentrated alkalies. It is obtained by heating chitin, the principal constituent of shells of crustaceans such as lobsters and crabs to a temperature of at least 60° C. together with an alkaline solution having an alkali concentration of 30 to 50% by weight (such as an aqueous solution of sodium hydroxide) and thereby deacetylating chitin. Chemically, it is a polysaccharide having a $\beta$-(1→4) linkage composed of D-glucosamine as basic units. Chitosan easily dissolves in a dilute aqueous solution of an acid such as acetic acid and hydrochloric acid with the formation of a salt, but when contacted again with an aqueous alkaline solution, is again coagulated and precipitated. A chitosan membrane can thus be obtained by dissolving chitosan in the aforesaid solvent (dilute aqueous acid solution), casting the solution onto a flat plate and then contacting it with an aqueous alkaline solution, or air-drying the cast membrane and contacting the dried membrane with an aqueous alkaline solution. Preferably, chitosan generally has a deacetylation degree of at least 50%, preferably at least 75%. To ionize the chitosantype polysaccharide membrane, the amino groups of the chitosan-type polysaccaride membrane are at least partly neutralized with an acid thereby to form an ammonium salt. Examples of the acid that can be utilized for neutralization include inorganic acids such as hydrochloric acid, hydrobromic acid, sulfuric acid and phosphoric acid; and organic acids such as acetic acid, methanesulfonic acid, formic acid, propionic acid, oxalic acid, malonic acid, succinic acid, fumaric acid, maleic acid, glutaric acid, phthalic acid, isophthalic acid, terephthaic acid, trimesic acid, trimellitic acid, citric acid, aconitic acid, sulfobenzoic acid, pyromellitic acid and ethylenediaminetetraacetic acid. These acids may be used singly or in combination.

Ionization of the chitosan-type polysaccharide membrane using these acids can be effected, for example, by a method which comprises immersing the chitosan-type polysaccharide membrane in a solution containing the acid to ionize the amino groups in the membrane; or by a method which comprises subjecting the chitosan-type polysaccharide membrane to pervaporation with a mixed liquid containing the acid to convert the amino groups in the chitosan-type polysaccharide membrane successively to ammonium ions. The former method is preferred because by setting the ionized membrane in a pervaporation device, separation by pervaporation can be immediately carried out.

The suitable content of counter anions in the ionized chitosan-type polysaccharide membrane in this invention depends upon the type of the counter anions and the type of the liquid mixture to be separated, and is properly selected depending upon each particular system employed. For example, when the liquid mixture to be separated is a water-ethanol mixture and the counter anions are sulfate ions, the amount of the counter anions in the membrane is one sufficient to neutralize at least 2 mole %, preferably 5 to 100 mole %, more preferably 15 to 100 mole %, of the amino groups of the chitosan-type polysaccharide membrane. The chitosan-type polysaccharide membrane may also be ionized by using a polyvalent metal ion to form a metal complex salt. Specifically, the polyvalent metal ion is coordinated with the amino groups of the chitosan-type polysaccharide to form a metal complex salt. Examples of the polyvalent metal ions are usually ions generated from polyvalent metals such as beryllium, magnesium, iron, nickel, cobalt, copper, zinc, chromium, aluminum and titanium. These polyvalent metal ions may be used singly or in combination.

Counter anions for the chitosan-type polysaccharide in which the polyvalent metal ions are coordinated may include, for example, anions generated from inorganic acids such as sulfuric acid, nitric acid, phosphoric acid and hydrohalic acids, and anions generated from organic acids such as acetic acid.

The polyvalent metal ions can be coordinated with the chitosan-type polysaccharide membrane by, for example, a method comprising subjecting the chitosan-type polysaccharide to an pervaporation treatment with a water-organic liquid mixture containing the polyvalent metal salt whereby the polyvalent metal ions are successively coordinated with the glucosamine rings of chitosan, or by a method comprising immersing the chitosan-type polysaccharide membrane in a solution containing the polyvalent metal salt to coordinate the polyvalent metal ions. The latter method is preferred because the chitosantype polysaccharide membrane so obtained can be immediately used for pervaporation upon setting it in a pervaporation apparatus.

Examples of the metal salt which is to be added to the water-organic liquid mixture for pervaporation or the solution for immersion include $Cr_2(SO_4)_3$, $FeSO_4$, $CoSO_4$, $NiSO_4$, $CuSO_4$, $Fe_2(SO_4)_3$, $MnSO_4$, $BeSO_4$, $MgSO_4$, $Al_2(SO_4)_3$, $Ti(SO_4)_2$ and $Mg(H_2PO_4)_2$. When the above metal salt is used, an acid generated by the double decomposition of the salt converts the amino groups of the chitosan-type polysaccharide into ammonium salts. This additional effect of ionization also contributes to the improved properties of the membrane.

Whether or not the polyvalent metal ions are coordinated in the membrane can be determined by atomic absorptiometry. With some types of metal ions, the treated membrane has a color inherent to the resulting complex. As a simple method, therefore, the formation of chitosan-metal salt membrane can be determined from this coloration. This method can also be applied to the aforesaid alginic acid-type polysaccharide membranes, and the formation of an alginic acid-metal salt membrane can be determined from the coloration of the membrane in a color inherent to the metal salt. Advantageously, in the present invention, at least 0.5 mole %, preferably 5 to 100 mole %, more preferably 15 to 100 mole % of the nitrogen atoms of the chitosan-type polysaccharide are coordinated with the metal ions.

Since cationic polysaccharide-type membranes including the ionized chitosan-type polysaccharide membranes are hydrophilic, the properties of the membranes are greatly affected by the concentration of water when the liquid mixture to be separated is a water-organic liquid mixture. The suitable concentration of the organic liquid at which the cationic ionized polysaccharide-type membranes exhibit high performance depends upon the type of the membrane, the type of the counter ions, and the type of the organic liquid, and therefore is properly selected according to each particular system employed. For example, in the separation of a water-ethanol mixture by using a membrane made of sodium alginate, it is desirable to perform the separation in an ethanol concentration of at least 60% by weight, preferably at least 80% by weight.

When the acid used to form the ammonium salt in the chitosan-type polysaccharide membrane is a polybasic acid such as sulfuric acid, phosphoric acid, oxalic acid, malonic acid, succinic acid, maleic acid, fumaric acid, glutaric acid, phthalic acid, terephthalic acid, isophthalic acid, trimellitic acid, trimesic acid, citric acid, asconitic acid, sulfobenzoic acid, pyromellitic acid or ethylenediaminetetraacetic acid, an ionic crosslinkage forms simultaneously with ionization, and therefore, the water resistance of the resulting membrane is increased. In particular, when a water-organic liquid mixture is to be separated, the use of this crosslinked membrane increases the range of the concentrations of the liquid mixture in which the membrane can be used, as compared with the use of the non-crosslinked membrane. For example, when a water-ethanol mixture is to be separated by using a membrane composed of chitosan-sulfate, the membrane can exhibit a high performance if the ethanol concentration is at least 30% by weight. Likewise, when the chitosan-type polysaccharide membrane is ionized by introducing the metal complex salt, a coordinated crosslinkage forms between the polyvalent metal ions and the amino groups of chitosan, and the water resistance of the membrane increases as in the case of treating with the polybasic acid.

The ionized chitosan-type polysaccharide membranes can also be crosslinked by chemical crosslinking methods such as the formation of an intermolecular ester or amide linkage using organic polybasic acids, or the formation of an intermolecular acetal linkage using aldehydes. The former method comprises esterifying or amidating the hydroxyl groups or amino groups of the cationic polysaccharide with a polybasic acid chloride or anhydride to introduce a crosslinked structure, and then treating the product with a monobasic or polybasic acid. The polybasic acid chloride or anhydride may include chlorides and anhydrides of the polybasic acids exemplified hereinabove. The latter method, for example, comprises immersing the chitosasn-type polysaccharide membrane in a solution containing an acid to form an ionized chitosan-type polysaccharide membrane, and then immersing the membrane in an acidic solution of an aldehyde to form an acetal crosslinked structure. Examples of the aldehyde that can be used in this method are formaldehyde, acetaldehyde, oxalaldehyde and glutaraldehyde.

The ionized membrane may contain one or more types of these ionic linkages, covalent linkages (ester and amide linkages) and coordinated linkages.

The methods of ionization and crosslinking described above for chitosan-type polysaccharides as an example of cationic polysaccharides can be applied generally to the ionization and crosslinking of the cationic polysaccharides.

[C] Cellulose derivative membranes

Cationic groups can be introduced into a cellulose derivative membrane by a known method, for example by tosylating the hydroxyl groups of cellulose or its derivative with tosyl chloride, and then reacting it with a nucleophilic agent such as an amine. Anionic groups may also be easily introduced into the cellulose derivative membrane by a known method, for example by reaction of the cellulose with chloroacetic acid under alkaline conditions when the cellulose derivative is carboxymethyl cellulose, or by reaction of the cellulose with a mixture of chlorosulfonic acid and pyridine when the cellulose derivative is cellulose sulfate.

The resulting cationic cellulose derivative or anionic cellulose derivative can be ionized in the same way as described hereinabove with regard to the chitosantype polysaccharides and alginic acid-type polysaccharides. Crosslinking may also be carried out by the same methods as described above.

The separation membranes provided by this invention generally have a thickness of 1 to 300 microns, preferably 5 to 200 microns. If the thickness is smaller than the specified limit, the membranes tend to have insufficient strength or water resistance. Larger thicknesses are not practical because the amount of a liquid mixture to permeate through the membrane becomes small. Even when the ionized polysaccharide-type membrane has a smaller thickness, it can be adapted for practical use by placing it on a supporting membrane such as a microporous membrane. In this case, the thickness of the ionized polysaccharide-type membrane can be decreased to less than 1 micron, for example to about 0.1 micron.

The separation membranes are used normally in a flat shape, but may also be used in a cylindrical form or in the form of hollow fibers to increase their surface area.

If the ionized membrane is dried before it is used for pervaporation, it can have a higher separation factor in the separation of a water-organic liquid mixture. Particularly, it has been found that when the ionized membrane of the invention is dried to a water content of not more than 25% by weight, preferably not more than 15% by weight, before it is used for pervaporation, a still higher separation factor can be obtained. There is no particular limitation on the method of drying the membrane, and any methods known per se can be used. For example, the membrane is left to stand in dry air, or is dried in vacuum. Conveniently, the ionized polyasaccharide membrane is set in a pervaporation device and before pervaporation is started, the downstream side of the membrane is maintained under reduced pressure of, for example, 0.3 mmHg for about 10 minutes by means of a vacuum pump to dry the membrane, or the membrane may be dehydrated by immersing it in an organic liquid having a water content of 0 to 20% by weight. The membrane may be heated to such an extent as not to degrade it. The water content of the membrane can be easily measured by a moisture meter.

Examples of water-organic liquid mixtures which can be separated by the separation membranes of this invention include water alcohol mixtures such as water/methanol, water/ethanol, water/n-propanol, water/isopropanol, water/n-butanol, water/isobutanol, water/namyl alcohol, water/n-hexanol, water/2-ethylhexanol, water/n-octanol, water/ethylene glycol, water/1,3-propanediol, water/1,4-butanediol, water/1,2-propylene glycol and water/glycerol; water/tetrahydrofuran; water/dioxane; water/methyl ethyl ketone; water/acetone; water/N,N-dimethylacetamide; and water/N,N-dimethylformamide. Examples of organic liquid/organic liquid mixtures which can be separated by the membranes of this invention include methyl acetate/methanol, ethyl acetate/ethanol, benzene/cyclohexane, methanol/acetone, benzene/methanol, benzene/ethanol, acetone/chloroform, methanol/acetone, ethyl-benzene/styrene, p-chloroethylbenzene/p-chlorostyrene, and toluene/methylcyclohexane.

The ionized polysaccharide-type membranes of this invention are particularly effective for the separation of water-organic liquid mixtures or organic liquid/organic liquid mixtures which contain polar organic liquids such as alcohols or ketones.

Any known pervaporation apparatuses may be used in this invention. The organic mixed liquids can be separated by operating such known apparatuses under normal conditions (see, for example, U.S. Pat. No. 2,953,502). In pervaporation, larger differences in pressure between the feed mixture side and the permeate side are more effective. For commercial practice, the pressure difference is preferably 0.5 to 1 atmosphere. The pressure of the feed mixture side is preferably pressure or pressures close to it, and the permeate side is preferably maintained under reduced pressure below the vapor pressure of the permeated component. The permeate side may be maintained under reduced pressure by evacuation, or under a low vapor pressure by passing a gas non-reactive with the component of the liquid mixture to be separated. The separating temperature is usually not more than 40° C., and below the azeotropic temperature of the organic liquid mixture to be separated, but is not particularly limited. When a separated liquid of the desired concentration cannot be obtained by passing the liquid mixture once through the ionized polysacchridetype membrane of the invention, it may be passed a number of times by arranging similar apparatuses in a continuous row, or the pervaporation is combined with distillation to concentrate and separate the liquid to the desired concentration.

As demonstrated by Examples to be given below, the membranes of this invention show a high separation factor even at high rates of permeation, and have excellent water resistance and mechanical strength. The use of the membranes of this invention can permit more efficient treatment of mixed liquids at high permeation rates while maintaining higher separation factors than separation methods using conventional membranes. For this reason, the separation system may be compacted and increased in treating ability, and the cost of separation can thus be reduced. The present invention contributes greatly to commercialization of membrane separation methods for the simplification of separating and purifying processes and for energy saving in the chemical and related industries, and has very high utility in industry.

As stated hereinabove, an organic liquid mixture can be treated by pervaporation using the membranes of this invention at high permeation rates while maintaining high separation factors. This advantage is quite unexpected from the prior knowledge. No clear reason for this advantage of the membranes of this invention has yet been determined. It is theorized however that the ionization of the polysaccharide increases the affinity of the membrane for polar molecules (such as water) and at the same time causes the polymer molecules to take a conformation suitable for separation.

The following examples illustrate the present invention more specifically.

EXAMPLES 1-3

A 1% by weight aqueous solution of sodium alginate (a product of Nakarai Chemicals Ltd.; 1000 cps) was prepared, cast onto a glass plate and spontaneously dried to form a homogeneous transparent sodium alginate membrane having a thickness of 20 to 25 microns.

A pervaporation apparatus having the resulting membrane set therein (available membrane area 7.0 cm$^2$) was fed at a temperature of 60° C. with a solution of a sulfate of each of the metals indicated in Table 1 in a 50:50 by weight mixture of water and ethanol in a concentration of $1 \times 10^{-2}$ mole/kg. While the concentration of ethanol on the liquid supply side of the apparatus was always maintained at 50% by weight, the permeate side of the apparatus was evacuated to 0.3 mmHg by a vacuum pump. The vapor that permeated through the membrane was condensed, and then its amount was measured. The composition of the permeate was analyzed by gas chromatography. The separation factors, permeation rates and the ratios (mole %) of crosslinkage of the exchange metals of the membranes were measured 6 hours after the start of pervaporation, and the results are shown in Table 1.

TABLE 1

| Example | Exchange metal | Separation factor | Permeation rate (kg/m$^2$·hr) | Ratio of crosslinkage of the exchange metal (mole %) |
|---|---|---|---|---|
| 1 | Co$^{2+}$ | 219.4 | 1.08 | 52.6 |
| 2 | Ni$^{2+}$ | 206.0 | 1.63 | 32.0 |
| 3 | Cr$^{3+}$ | 60.78 | 1.15 | 9.3 |

EXAMPLES 4-7

The same sodium alginate membrane as used in Example 1 was immersed in a solution of each of the metal salts indicated in Table 2 in a 50:50 by weight mixture of water and ethanol to substitute each of these metal ions for the sodium ion of the membrane. Thereafter, the membrane was set in the same pervaporation apparatus as used in Example 1. A (50:50 by weight mixture of water and ethanol free from a metal ion was fed into the apparatus, and the same operation as in Example 1 was carried out.

The separation factors, permeation rates and the ratios (mole %) of crosslinkage of the exchange metals of the membranes were measured 6 hours after the start of pervaporation, and the results are shown in Table 2.

TABLE 2

| Example | Metal salt | Metal ion concentration during immersion (mole/kg) | Separation factor | Permeation rate (kg/m$^2$·hr) | Ratio of crosslinkage of the exchange metal (mole %) |
|---|---|---|---|---|---|
| 4 | CoSO$_4$ | $1.5 \times 10^{-3}$ | 1355 | 0.58 | 52.6 |
| 5 | CoCl$_2$ | " | 2382 | 1.03 | 66.6 |
| 6 | CoSO$_4$ | " | 259.7 | 2.60 | 23.0 |
| 7 | Al$_2$(SO$_4$)$_3$ | $1 \times 10^{-2}$ | 89.78 | 1.51 | 15.4 |

EXAMPLES 8-25

In each run, the same sodium alginate membrane as used in Example 1 was immersed in a solution of each of the various metal salts indicated in Table 3 in a concentration of $1.5 \times 10^{-3}$ mole/kg in a 50:50 by weight mixture of water and ethanol at 30° C. for 17 hours to exchange the sodium ion of the sodium alginate membrane with each of these metal ions. Thereafter, the membrane was set in the same perevaporation apparatus as used in Example 1, and a 50:50 by weight mixture of water/ethanol free from an ion was fed into the apparatus, and the same operation as in Example 1 was carried out. The separation factor and permeation rate of the membrane were measured 6 hours after the start of pervaporation, and the results are shown in Table 3.

TABLE 3

| Example | Metal salt | Separation factor | Permeation rate (kg/m$^2$ · hr) |
| --- | --- | --- | --- |
| 8 | AgNO$_3$ | 332.9 | 1.82 |
| 9 | CaCl$_2$ | 372.6 | 2.24 |
| 10 | SrCl$_2$ | 507.4 | 2.58 |
| 11 | Ba(OH)$_2$ | 694.7 | 2.36 |
| 12 | MnSO$_4$ | 107.0 | 1.88 |
| 13 | CoSO$_4$ | 481.6 | 1.94 |
| 14 | NiSO$_4$ | 468.6 | 2.15 |
| 15 | CuSO$_4$ | 263.8 | 2.40 |
| 16 | ZnSO$_4$ | 265.6 | 1.86 |
| 17 | Fe(NH$_4$)$_2$(SO$_4$)$_2$ | 143.2 | 2.30 |
| 18 | SnSO$_4$ | 149.7 | 1.72 |
| 19 | Al$_2$(SO$_4$)$_3$ | 41.7 | 2.23 |
| 20 | CrCl$_3$ | 150.4 | 2.75 |
| 21 | CeCl$_3$ | 475.0 | 2.36 |
| 22 | Eu(NO$_3$)$_3$ | 339.0 | 2.30 |
| 23 | RhCl$_3$ | 28.4 | 2.85 |
| 24 | ZrCl$_4$ | 141.0 | 1.47 |
| 25 | TiCl$_4$ | 163.4 | 1.73 |

EXAMPLES 26–32

In each run, the same sodium alginate membrane as used in Example 1 was immersed in a solution of each of the nickel salts indicated in Table 4 in a nickel concentration of $1.5 \times 10^{-3}$ mole/kg in a 50:50 by weight mixture of water and ethanol at 30° C. for 17 hours to exchange the sodium ion of the membrane with a nickel ion. The membrane was set in the same pervaporation apparatus as used in Example 1, and a 50:50 by weight mixture of water and ethanol was separated at 60° C. under 0.3 mmHg. The separation factors and permeation rates of the membrane were measured 6 hours after the start of pervaporation, and the results are shown in Table 4.

TABLE 4

| Example | nickel salt | Separation factor | Permeation rate (kg/m$^2$ · hr) |
| --- | --- | --- | --- |
| 26 | NiCl$_2$ | 553.1 | 2.09 |
| 27 | NiBr$_2$ | 542.9 | 2.17 |
| 28 | NiI$_2$ | 430.3 | 2.18 |
| 29 | Ni(NO$_3$)$_2$ | 517.6 | 1.83 |
| 30 | Ni(AcO)$_2$ | 687.4 | 1.66 |
| 31 | Ni(HCO$_2$)$_2$ | 404.8 | 2.03 |
| 32 | NiSO$_4$ | 468.6 | 1.94 |

EXAMPLES 33–38

In each run, the same sodium alginate membrane as used in Example 1 was immersed in a solution of cobalt sulfate in a cobalt concentration of $1.5 \times 10^{-3}$ mole/kg) in a 50:50 by weight mixture of water and ethanol at 30° C. for 17 hours to exchange the sodium ion of the membrane with a cobalt ion. The membrane was then set in the same perevaporation apparatus as used in Example 1, and a water/ethanol mixture having each of the ethanol concentrations shown in Table 5 was separated at 60° C. under 0.3 mmHg. The separation factors and permeation rates were measured 6 hours after the start of pervaporation, and the results are shown in Table 5.

The ratio of crosslinking of the exchange metal was 53.0 mole %.

TABLE 5

| Example | Concentration of ethanol (wt. %) | Separation factor | Permeation rate (kg/m$^2$ · hr) |
| --- | --- | --- | --- |
| 33 | 30 | 137.3 | 2.89 |
| 34 | 40 | 214.1 | 2.43 |
| 35 | 50 | 259.7 | 2.60 |
| 36 | 65 | 794.0 | 1.10 |
| 37 | 75 | 1747.0 | 0.63 |
| 38 | 85 | 3202.0 | 0.15 |

EXAMPLES 39–42

In each run, the same cobalt-exchanged sodium alginate membrane as obtained in Example 33 was set in the same pervaporation apparatus as used in Example 1. Each of the various water/organic mixtures (50% by weight of the organic liquid) was separated in the apparatus at 60° C. under 0.3 mmHg. The separation factors and permeation rates were measured 6 hours after the start of pervaporation, and the results are shown in Table 6. In all cases, water preferentially permeated through the membrane.

TABLE 6

| Example | Water-organic mixture | Separation factor | Permeation rate (kg/m$^2$ · hr) |
| --- | --- | --- | --- |
| 39 | Water/isopropanol | 601.8 | 3.64 |
| 40 | Water/t-butanol | 2424 | 2.48 |
| 41 | Water/acetone | 1842 | 2.84 |
| 42 | Water/dioxane | 2016 | 2.37 |

EXAMPLES 43–47

In each run, a 5% by weight aqueous slurry of alginic acid (a product of Nakarai Chemicals Ltd.) was prepared, and an aqueous solution (5–25% by weight) of K, NH$_4$ or Li was added in an amount of 1.1 equivalents to alginic acid was added to obtain an aqueous solution of each of the alginate salts. The aqueous solution was poured into anhydrous ethanol to precipitate the alginate, and the excess of the alkali was removed by washing to obtain each of the fibrous alginates shown in Table 7. A 3% by weight aqueous solution of the alginate was prepared, cast on a glass plate, and spontaneously dried to form a homogeneous transparent alginate membrane having a thickness of 20 to 25 microns.

The membrane was subjected exchange with each of the metal ions shown in Table 7 in the same way as in Example 8. The resulting membrane was set in the same pervaporation apparatus as used in Example 1, and a 50:50 mixture of ethanol and water was separated by pervaporation at 60° C. under 0.3 mmHg. The separation factors and permeation rates measured 6 hours after the start of pervaporation are shown in Table 7.

TABLE 7

| Example | Exchange metal ion | Alginate | Separation factor | Permeation rate (kg/m$^2$ · hr) |
| --- | --- | --- | --- | --- |
| 43 | Co$^{2+}$ | K alginate | 396.4 | 1.70 |
| 44 | | NH$_4$ alginate | 222.8 | 1.54 |
| 45 | Sr$^{2+}$ | Li alginate | 257.5 | 3.16 |
| 46 | | K alginate | 650.7 | 2.62 |

TABLE 7-continued

| Example | Exchange metal ion | Alginate | Separation factor | Permeation rate (kg/m² · hr) |
|---|---|---|---|---|
| 47 | | NH₄ alginate | 274.8 | 2.16 |

EXAMPLES 48–49

In each run, the same sodium alginate membrane having a thickness of 20 to 25 microns as produced in Example 1 was immersed in an aqueous ethanol solution containing 3% by weight of hydrochloric acid at room temperature for 24 hours. The membrane was subjected to metal ion exchange by the same method as in Example 8 using cobalt sulfate or strontium chloride. The resulting membrane was set in the same pervaporation apparatus as used in Example 1, and a 50:50 mixture of ethanol and water was separated by pervaporation at 60° C. under 0.3 mmHg. The separation factors and permeation rates measured 6 hours after the start of pervaporation are shown in Table 8.

TABLE 8

| Example | Exchange metal ion | Separation factor | Permeation rate (kg/m² · hr) |
|---|---|---|---|
| 48 | Co²⁺ | 34.2 | 1.86 |
| 49 | Sr²⁺ | 34.8 | 3.16 |

COMPARATIVE EXAMPLE 1

The alginic acid membrane obtained in the same way as in Example 48 was set in the same pervaporation apparatus as used in Example 1 without subjecting it to metal ion exchange. Thereafter, the same separating operation as in Example 48 was caried out. Six hours after the start of pervaporation, the membrane had a separation factor of 9.69, and a permeation rate of 3.36 kg/m².hr.

EXAMPLES 50–55

In each run, sixty grams of sodium alginate (a product of Nakarai Chemicals Ltd.; 1000 cps) was added to 1 liter of a 2% by weight aqueous solution of hydrochloric acid, and the mixture was stirred at room temperature for 1 hour. The precipitated alginic acid was separated by filtration, and washed with this dilute hydrochloric acid three times. After separation, alginic acid was washed with cold distilled water until the water became neutral, and finally washed with ethanol, followed by air drying. There was obtained 47 g of purified alginic acid which contained 230 ppm of sodium.

Ten grams of the resulting purified alginic acid was added to 200 ml of an aqeuous solution containing sodium hydroxide in an amount of 1.2 equivalents per equivalent of the carboxyl group of alginic acid. The mixture was warmed to 50° C. to dissolve alginic acid. After it dissolved completely, the solution was poured into anhydrous ethanol to precipitate fibrous sodium alginate. The precipitated sodium alginate was washed three times with 1 liter of ethanol to remove the excess of sodium hydroxide and to obtain 10.9 g of purified sodium alginate which contained 11.0% by weight (theory: 11.6% by weight) of sodium.

A 5% by weight aqueous solution of purifed sodium alginate was prepared, cast on a glass plate, and spontaneously dried to obtain a homogeneous transparent purified sodium alginate membrane having a thickness of 15 to 25 microns.

A dry membrane (thickness 17 microns) of purified sodium alginate was immersed at room temperature for 2 hours in a 50:50 mixture of ethanol and water containing 2% by weight of hydrochloric acid to form an alginic acid (carboxylic acid type) membrane. The membrane was then immersed at 30° C. for 13 hours in a 50:50 by weight mixture of ethanol and water containing sodium hydroxide in various concentrations. Thus, partially ionized sodium alginate membranes having varying degrees of ionization are shown in Table 9 were prepared. Each of the membranes was set in the same pervaporation apparatus as used in Example 1, and a 90:10 by weight mixture of ethanol and water was separated at 60° C. under 0.3 mmHg. The properties of the membrane measured 6 hours after the start of pervaporation are shown in Table 9.

TABLE 9

| Example | Na content (mole %) in the membrane (*) | Permeation rate (kg/m² · hr) | Separation factor |
|---|---|---|---|
| 50 | 12.5 | 0.31 | 88.56 |
| 51 | 32.6 | 0.15 | 153.8 |
| 52 | 52.3 | 0.13 | 1308 |
| 53 | 63.6 | 0.11 | 1509 |
| 54 | 90.3 | 0.19 | 6187 |
| 55 | 97.3 | 0.25 | 12900 |

(*)Based on the carboxyl groups of alginic acid.

COMPARATIVE EXAMPLE 2

The same pervaporation experiment as in Example 50 was carried out by using the purified alginic acid (carboxylic acid type) membrane (Na content 0.01 mole %) obtained in Example 50. The membrane had a separation factor of 10.32 and a permeation rate of 1.87 kg/m².hr.

COMPARATIVE EXAMPLE 3

The same sodium alginate membrane as used in Example 1 was set in the same pervaporation apparatus as used in Example 1. A water-ethanol mixture (ethanol concentration 50% by weight) containing no metal ion was supplied at a temperature of 60° C., and subjected to the same operation as in Example 1. The membrane dissolved and ruptured, and its properties could not be measured.

EXAMPLES 56–59

A purified sodium alginate membrane (thickness 18–23 microns) was set in the same pervaporation apparatus as used in Example 1, and each of the aqueous solutions of organic liquids shown in Table 10 was separated by pervaporation at 60° C. under 0.3 mmHg. The properties of the membrane measured 6 hours after the start of pervaporation are shown in Table 10.

TABLE 10

| Example | Water-organic liquid mixture (parts by weight) | Separation factor | Permeation rate (kg/m² · hr) |
|---|---|---|---|
| 56 | Acetone/water (80/20) | 3353 | 3.03 |
| 57 | iso-Propanol/water (80/20) | 69400 | 1.85 |
| 58 | Dioxane/water (80/20) | 23120 | 1.93 |

TABLE 10-continued

| Example | Water-organic liquid mixture (parts by weight) | Separation factor | Permeation rate (kg/m² · hr) |
|---|---|---|---|
| 59 | Ethanol/water (95/5) | 44600 | 0.05 |

EXAMPLES 60-64

A purified sodium alginate membrane was converted to an alginic acid (carboxylic acid-type) membrane. The alginic acid membrane was immersed in a solution of each of the alkalies shown in Table 11 in a 50:50 by weight mixture of methanol and water (the amount of the alkali was 1 equivalent to the carboxyl groups of alginic cid) at 30° C. for 13 hours to form an alginate membrane. The membrane was then set in the same pervaporation apparatus as used in Example 1, and a 90:10 by weight mixture of ethanol and water was fed into the apparatus and separated by pervaporation at 60° C. under 0.3 mmHg. The properties of the membrane measured 6 hours after the start of pervaporation are shown in Table 11.

TABLE 11

| Example | Alginate | Separation factor | Permeation rate (kg/m² · hr) |
|---|---|---|---|
| 60 | Li alginate | 95.4 | 0.29 |
| 61 | Na alginate | 1509 | 0.11 |
| 62 | K alginate | 1402 | 0.39 |
| 63 | Rb alginate | 1237 | 0.32 |
| 64 | Cs alginate | 408 | 0.28 |

EXAMPLE 65

Cellulose powder (15 g) was suspended in 400 ml of isopropanol, and a 30% by weight aqueous solution of sodium hydroxide was added. Subsequently, a solution of 15.5 g of monochloroacetic acid in 50 ml of isopropanol was added. The mixture was reacted at 60° C. for 4 hours, and the solid material was washed several times with hydrous methanol to form carboxymethyl cellulose sodium salt. The sodium salt was dissolved in water to a concentration of 5% by weight. The solution was cast onto a glass plate, and dried in air to form a sodium carboxylmethyl celulose membrane (thickness 20 microns). The resulting membrane was set in the same pervaporation apparatus as used in Example 1. A 90:10 by weight mixture of ethanol and water was charged, and separated by pervaporation at 30° C. under 0.3 mmHg. After 6 hours, the membrane showed a separation factor of 873.3 and a permeation rate of 0.10 kg/m².hr.

EXAMPLE 66

Cellulose powder (15 g) was suspended in 400 ml of isopropanol, and a 30% by weight aqueous solution of sodium hydroxide was added, and subsequently a solution of 15.5 g of monochloroacetic acid in 50 ml of isopropanol was added. The mixture was reacted at 60° C. for 4 hours. The solid material was washed several times with hydrous methanol to obtain carboxymethyl cellulose sodium salt. The sodium salt as dissolved in water to a concentration of 5% by weight. The solution was cast onto a glass plate, and dried in air to form a sodium carboxylmethyl cellulose membrane (thickness 20 microns). The resulting membrane was set in the same pervaporation apparatus as used in Example 1. A 90:10 by weight mixture of ethanol and water containng calcium chloride in a concentration of $1.0 \times 10^{-3}$ mole/kg was charged, and separated by pervaporation in the same way as in Example 1. After 6 hours, the membrane showed a separation factor of 228.3 and a permeation rate of 40.1 g/m².hr.

EXAMPLE 67

A 1% by weight of guar gum sodium phosphate (a product of Meyhall Chemical AG) was cast on a glass plate and dried in air to obtain a dry film (thickness 32 microns) of guar gum sodium phosphate. The resulting membrane was set in the same pervaporation apparatus as used in Example 1. A 50:50 by weight mixture of ethanol and water was charged, and separated by pervaporation at 60° C. under 0.3 mmHg. After 6 hours, the membrane showed a separation factor of 126.5 and a permeation rate of 2.46 kg/m².hr.

EXAMPLE 68

A 5% by weight aqueous solution of sodium chondroitin sulfate (a product of Wako Pure Chemical Industry, Ltd.) was cast on a glass plate and dried in air to obtain a dry film (thickness 37 microns) of sodium chondroitin sulfate. The resulting membrane was set in the same pervaporation apparatus as used in Example 1. A 90:10 by weight mixture of ethanol and water was charged, and separated by pervaporation at 30° C. under 0.3 mmHg. After 6 hours, the membrane showed a separation factor of 137.2 and a permeation rate of 0.17 kg/m².hr.

EXAMPLE 69

Pervaporation was carried out in the same way as in Example 68 except that the same sodium chondroitin sulfate membrane as in Example 68 was used and a 90:10 mixture of ethanol and water containing calcium chloride in a concentration of $1.5 \times 10^{-3}$ mole/kg was used. After 6 hours, the membrane showed a separation factor of 3012 and a permeation rate of 0.17 kg/m².hr.

EXAMPLES 70-83

In each run, a chitosan membrane (thickness 15-22 microns) having a degree of deacetylation of 98 mole % was immersed in a 50:50 by weight mixture of ethanol and water containing a polybasic acid in an amount of 1.3 moles per mole of the amino groups of chitosan at 30° C. for 13 hours to obtain a chitosan salt membrane having an ionically crosslinked structure. The membrane was set in the same pervaporation apparatus as used in Example 1. A 50:50 by weight mixture of ethanol and water was charged and separated at 60° C. under 0.3 mmHg. After six hours from the start of pervaporation, the membrane showed the separation factor and permeation rate shown in Table 12.

TABLE 12

| Example | Polybasic acid | Separation factor | Permeation rate (kg/m² · hr) |
|---|---|---|---|
| 70 | sulfuric acid | 338.3 | 1.51 |
| 71 | phosphoric acid | 358.7 | 0.61 |
| 72 | oxalic acid | 262.7 | 1.63 |
| 73 | malonic acid | 58.18 | 2.68 |
| 74 | maleic acid | 24.89 | 3.91 |
| 75 | succinic acid | 51.38 | 2.41 |
| 76 | fumaric acid | 104.7 | 2.32 |
| 77 | terephthalic acid | 55.83 | 2.59 |
| 78 | phthalic acid | 34.61 | 2.53 |

TABLE 12-continued

| Example | Polybasic acid | Separation factor | Permeation rate (kg/m$^2$ · hr) |
|---|---|---|---|
| 79 | isophthalic acid | 52.37 | 2.08 |
| 80 | trimesic acid | 222.6 | 0.74 |
| 81 | trimellitic acid | 239.3 | 0.68 |
| 82 | citric acid | 190.4 | 0.74 |
| 83 | pyromellitic acid | 180.6 | 1.90 |

EXAMPLE 84

A chitosan membrane (thickness 17 microns) having a degree of deacetylation of 98 mole % was immersed in a 50:50 by weight mixture of ethanol and water containing hydrochloric acid in an amount of 1.3 moles per mole of the amino groups of chitosan at 30° C. for 13 hours to obtain a chitosan salt membrane. The membrane was immersed in a 50:50 by weight mixture of dioxane and water containing 2% formalin and acidified by hydrochloric acid at room temperature for 5 minutes to form a formal-crosslinked chitosan salt membrane. The membrane was set in the same pervaporation apparatus as in Example 1. A 50:50 by weight mixture of ethanol and water was charged and separated at 60° C. under 0.3 mmHg. After 6 hours from the start of pervaporation, the membrane showed a separation factor of 17.92 and a permeation rate of 4.39 kg/m$^2$.hr.

EXAMPLE 85 AND COMPARATIVE EXAMPLE 4

A chitosan membrane (thickness 17 microns) having a degree of acetylation of 98 mole % was immersed in a dioxane solution of pyromellitic anhydride dissolved in a large excess with respect to the amino groups of chitosan at room temperature for 20 hours to obtain a chitosan membrane crosslinked by amide linkages. The crosslinked membrane was immersed in 200 g of a 50:50 by weight mixture of ethanol and water containing hydrochloric acid in a concentration of $1.5 \times 10^{-3}$ mole/kg at 30° C. for 13 hours to obtain a crosslinked chitosan salt membrane. The ionized membrane was set in the same pervaporation apparatus as used in Example 1. A 50:50 by weight mixture of ethanol and water was charged and separated at 60° C. under 0.3 mmHg. The membrane showed a separation factor of 27.86 and a permeation rate of 4.85 kg/m$^2$.hr.

For comparison, the same experiment as above was repeated except that the crosslinked chitosan membrane not ionized was used. The membrane had a separation factor of 17.49 and a permeation rate of 2.87 kg/m$^2$.hr.

EXAMPLES 86-87 AND COMPARATIVE EXAMPLE 5

A chitosan membrane (thickness 17 microns) having a degree of deacetylation of 98 mole % was immersed in a 50:50 by weight mixture of ethanol and water containing hydrochloric acid or acetic acid in an amount of 1.3 moles per mole of the amino groups of chitosan at 30° C. for 13 hours to obtain a chitosan salt membrane. The membrane was dried at constant length at room temperature, and then set in the same pervaporation apparatus as used in Example 1. A 90:10 by weight mixture of ethanol and water was charged and separated at 60° C. under 0.3 mmHg.

For comparison, the above experiment was repeated except that a non-ionized chitosan membrane dried at constant length was used instead of the above ionized membrane.

The properties of the membranes tested are shown in Table 13.

TABLE 13

| Example | Acid | Separation factor | Permeation rate (kg/m$^2$ · hr) |
|---|---|---|---|
| 86 | Acetic acid | 123.4 | 0.40 |
| 87 | Hydrochloric acid | 593.1 | 0.21 |
| Comparative Example 5 | — | 35.5 | 0.35 |

EXAMPLES 88-93

In each run, a chitosan membrane (thickness 15-20 microns) having a degree of acetylation of 98 mole % was immersed in a 50:50 by weight mixture of ethanol and water containing sulfuric acid in varying concentrations at 30° C. for 13 hours to prepare a partially ionized chitosan salt membrane having the degree of ionization shown in Table 14. The membrane was set in the same pervaporation apparatus as used in Example 1. A 50:50 by weight mixture of ethanol and water was charged, and separated by pervaporation at 60° C. under 0.3 mmHg. The properties of the membrane measurd 6 hours after the start of pervaporation are shown in Table 14.

TABLE 14

| Example | Concentration of $SO_4^{2-}$ (mole %) (*) | Separation factor | Permeation rate (kg/m$^2$ · hr) |
|---|---|---|---|
| 88 | 7.4 | 30.74 | 2.68 |
| 89 | 12.2 | 72.64 | 1.78 |
| 90 | 17.0 | 116.21 | 2.14 |
| 91 | 32.4 | 176.8 | 1.83 |
| 92 | 40.6 | 374.5 | 1.62 |
| 93 | 41.8 | 448.3 | 1.99 |

(*)Mole % based on the amino groups of chitosan.

EXAMPLES 94-99

In each run, a chitosan membrane (thickness 17-20 microns) having a degree of deacetylation of 98 mole % was immersed in a 50:50 by weight mixture of ethanol and water containing an equimolar proportion of sulfuric acid to the amino groups of chitosan at 30° C. for 13 hours to obtain a chitosan sulfate membrane. The resulting membrane was set in the same pervaporation apparatus as used in Example 1. An aqueous solution of ethanol having various ethanol concentrations as shown in Table 15 was charged, and separated by pervaporation at 60° C. under 0.3 mmHg. The properties of the membrane measured 6 hours later are shown in Table 15.

TABLE 15

| Example | Concentration of ethanol (wt. %) | Separation factor | Permeation rate (kg/m$^2$ · hr) |
|---|---|---|---|
| 94 | 50 | 323.8 | 2.56 |
| 95 | 60 | 657.6 | 1.86 |
| 96 | 75 | 1660 | 1.06 |
| 97 | 85 | 1712 | 0.45 |
| 98 | 90 | 1040 | 0.16 |

TABLE 15-continued

| Example | Concentration of ethanol (wt. %) | Separation factor | Permeation rate (kg/m² · hr) |
|---------|----------------------------------|-------------------|------------------------------|
| 99 | 95 | 252.9 | 0.042 |

EXAMPLES 100–101

In each run, a chitosan membrane (thickness 17–20 microns) having a degree of deacetylation of 98 mole % and swollen with water was immersed at room temperature for 18 hours in 200 ml of a 10% by weight dioxane solution of each of the acid anhydrides shown in Table 16 (the acid anhydride was present in a large excess with respect to the amino groups of chitosan) to obtain an N-acylated chitosan membrane. The N-acylated chitosan membrane was immersed in a 50:50 by weight mixture of ethanol and water containing sulfuric acid in a concentration of $1.5 \times 10^{-3}$ mole/kg at 30° C. for 13 hours to obtain an N-modified chitosan ionized with sulfuric acid. The ionized membrane was set in the same pervaporation apparatus as used in Example 1. A 50:50 by weight mixture of ethanol and water was charged, and separated by pervaporation at 60° C. under 0.3 mmHg. The properties of the membrane measured 6 hours later are shown in Table 16.

TABLE 16

| Example | Acid anhydride | Separation factor | Permeation rate (kg/m² · hr) |
|---------|----------------|-------------------|------------------------------|
| 100 | Pyromellitic anhydride | 392.1 | 2.31 |
| 101 | Sulfobenzoic anhydride | 418.7 | 2.05 |

EXAMPLES 102–103

The same N-acylated chitosan membrane as obtained in Example 100, without further treatment, was set in the same pervaporation apparatus as used in Example 1, and a 50:50 by weight mixture of ethanol and water was separated by pervaporation at 60° C. under 0.3 mmHg. The properties of the membrane measured 6 hours later are shown in Table 17.

TABLE 17

| Example | Acid anhydride | Separation factor | Permeation rate (kg/m² · hr) |
|---------|----------------|-------------------|------------------------------|
| 102 | Pyromellitic anhydride | 17.49 | 2.87 |
| 103 | Sulfobenzoic anhydride | 16.71 | 4.12 |

EXAMPLES 104–114

In each run, chitosan (the degree of deacetylation 50 mole %; a product of Tokyo Kasei Co., Ltd.) was formed into an acetate salt aqueous solution. A membrane was formed by the dry method from the aqueous solution and then neutralized to give a chitosan membrane having a thickness of 20 to 30 microns. The membrane was set in the same pervaporation apparatus as used in Example 1. A 50:50 by weight mixture of water and ethanol containing each of the metal ions indicated in Table 18 in a concentration of $1 \times 10^{-2}$ mole/kg was charged at 60° C. and separated by pervaporation under 1 mmHg. The separation factor and permeation rate of the membrane were measured 6 hours after the start of pervaporation. Furthermore, 6 hours later, the membrane was removed from the pervaporation apparatus, and the metal ion concentration of the membrane was measured by atomic absorptiometry. The appearance of the membrane was also determined. The results are shown in Table 18.

TABLE 18

| Example | Metal ion in the mixed liquid | Appearance of the membrane | Metal ion concentration in the membrane (mole % based on the N atoms of chitosan) | Separation factor | Permeation rate (kg/m² · hr) |
|---------|-------------------------------|----------------------------|----|-------------------|------------------------------|
| 104 | $Be^{2+}$ | Colorless, transparent | 5.0 | 186.8 | 1.15 |
| 105 | $Cr^{3+}$ | Pale bluish green, transparent | 1.5 | 185.9 | 1.13 |
| 106 | $Al^{3+}$ | Colorless, transparent | 4.9 | 156.8 | 0.69 |
| 107 | $Ti^{4+}$ | Colorless, transparent | 2.2 | 108.3 | 1.25 |
| 108 | $Co^{2+}$ | Pink, transparent | 6.2 | 71.9 | 0.88 |
| 109 | $Mn^{2+}$ | Pale pink, transparent | 11.3 | 66.1 | 1.08 |
| 110 | $Zn^{2+}$ | Colorless, transparent | 17.6 | 64.2 | 0.94 |
| 111 | $Ni^{2+}$ | Pale green, transparent | 5.6 | 54.9 | 0.95 |
| 112 | $Mg^{2+}$ | Colorless, transparent | 3.4 | 38.3 | 2.39 |
| 113 | $Cu^{2+}$ | Pale blue, transparent | 25.7 | 37.0 | 1.03 |
| 114 | $Fe^{2-3+}$ | Yellow, transparent | 6.2 | 33.9 | 1.31 |

COMPARATIVE EXAMPLE 6

The same chitosan membrane as used in Example 104 was set in the same pervaporation apparatus as used in Example 1, and a 50:50 by weight mixture of water and ethanol not containing a metal salt was charged at 60° C. and separated in the same way as in Example 104. After 6 hours from the start of pervaporation, the membrane had a separation factor of 9.67 and a permeation rate of 4.57 kg/m².hr.

EXAMPLES 115–118

In each run, the same chitosan membrane as used in Example 104 was set in the same pervaporation apparatus as used in Example 1. A 50:50 by weight mixture of water and ethanol containing a magnesium salt (special reagent grade) in each of the metal ion concentrations indicated in Table 19 was charged into the apparatus and subjected to pervaporation under 1 mmHg. The separation factor and permeation rate of the membrane measured 6 hours after the start of pervaporation are shown in Table 19.

TABLE 19

| Example | Anion | Metal ion concentration (moles/kg) | Separation factor | Permeation rate (kg/m² · hr) |
|---|---|---|---|---|
| 115 | $H_2PO_4^-$ | $4 \times 10^{-4}$ | 78.7 | 0.86 |
| 116 | $SO_4^{2-}$ | $1 \times 10^{-2}$ | 38.3 | 2.4 |
| 117 | $NO_3^-$ | $1 \times 10^{-2}$ | 18.3 | 3.1 |
| 118 | $I^-$ | $1 \times 10^{-2}$ | 18.3 | 3.0 |

EXAMPLE 119

The same chitosan membrane as used in Example 104 was immersed in a 50:50 by weight mixture of water and ethanol containing cobalt sulfate (special reagent grade) for 13 hours. The resulting membrane was transparent and pink in color. From the presence of 9.8 mole % (based on the nitrogen atoms of chitosan) of cobalt ions, it was determined that this membrane was a chitosan-cobalt complex membrane.

The chitosan-cobalt complex membrane was set in the same pervaporation apparatus as used in Example 1, and a 50:50 by weight mixture of water and ethanol was charged and separated by pervaporation at 60° C. under 1 mmHg. After 6 hours from the start of pervaporation, the membrane had a separation factor of 73.3 and a permeation rate of 2.30 kg/m².hr.

EXAMPLE 120

A 50:50 by weight mixture of water and ethanol containing cobalt sulfate dissolved in a concentration of $1.5 \times 10^{-3}$ mole/kg was fed at 60° C. into a pervaporation apparatus in which a chitosan membrane (thickness 15 microns) having a degree of deacetylation of 99 mole % was set (available membrane surface area 28.3 cm²). While maintaining the ethanol concentration of the solution always at 50% by weight, the permeation side of the apparatus was evaluated to 1 mmHg by a vacuum pump. After the separation factor of the membrane reached 844, the concentration of ethanol in the solution was progressively increased. The separation factor and permeation rate of the membrane at each of the concentrations are shown in Table 20. When the temperature of the mixed solution was lowered to 40° C. at an ethanol concentration of 81.7% by weight, the membrane showed a separation factor of 3010 and a permeation rate of 0.12 kg/m².hr.

TABLE 20

| Ethanol concentration (wt. %) | 50 | 61.7 | 75.6 | 81.7 |
|---|---|---|---|---|
| Separation factor | 844.2 | 1309 | 1800 | 1858 |
| Permeation rate (kg/m² · hr) | 1.02 | 0.69 | 0.46 | 0.24 |

EXAMPLE 121

The same chitosan membrane as used in Example 104 was set in the same pervaporation apparatus as used in Example 1. A 50:50 by-weight mixture of water and t-butanol containing cobalt sulfate in a concentration of $1.0 \times 10^{-2}$ mole/kg and heated at 60° C. was charged, and separated by pervaporation at 60° C. under 0.3 mmHg. After 6 hours from the start of pervaporation, the membrane had a separation factor of 671.2 and a permeation rate of 1.98 kg/m².hr.

EXAMPLE 122

The same chitosan membrane as used in Example 104 was set in the same pervaporation apparatus as used in Example 1. A 50:50 by weight mixture of water and acetone at 25° C. containing cobalt sulfate dissolved in a concentration of $1.0 \times 10^{-2}$ mole/kg was charged and separated by pervaporation under 1 mmHg. After 6 hours from the start of pervaporation, the membrane had a separation factor of 234.5 and a permeation rate of 1.81 kg/m².hr.

EXAMPLES 123-125

In each run, a cellulose membrane (made by Union Carbide Corporation) was immersed for 24 hours in 1 kg of a 25% aqueous solution of sodium hydroxide. The cellulose membrane was then withdrawn, and the excessive alkali adhering to it was wiped off with a filter paper to obtain an alkaline cellulose membrane. The alkaline cellulose membrane was immersed in a solution of 60 g of p-toluenesulfonyl (tosyl) chloride in 500 g of benzene at room temperature for 24 hours to obtain a tosylated cellulose membrane. The tosylated cellulose membrane was aminated either by immersing it in a solution of 20 g of a high-boiling (>70° C.) amine in 200 ml of dimethylforma amide under a nitrogen atmosphere at 70° C. for 48 hours; or by putting the tosylated cellulose membrane and an aqeuous solution of a low-boiling (<70° C.) amine in an autoclave, and treating the membrane at 50° to 70° C. for 48 hours.

The aminated cellulose membrane was immersed in 200 g of a 3% aqueous solution of sodium hydroxide and heated at 70° C. for 2 hours to hydrolyze the unreacted tosyl group.

The aminated cellulose membrane (35 microns thick) was set in the same pervaporation apparatus as used in Example 1. A 50:50 by weight mixture of water and ethanol containing cobalt sulfate dissolved in a concentration of $1.5 \times 10^{-3}$ mole/kg was charged at 60° C., and separated by pervaporation under 0.3 mmHg. The properties of the membrane measured 6 hours after the start of pervaporation are shown in Table 21.

After the pervaporation test, the membranes were recovered. All the membranes shown in Table 21 were colored reddish brown, and from this, it was confirmed that a $Co^{2+}$ complex formed in these membranes.

TABLE 21

| Example | Aminated cellulose membrane | Separation factor | Permeation rate (kg/m² · hr) |
|---|---|---|---|
| 123 |  | 72.02 | 3.47 |
| 124 | 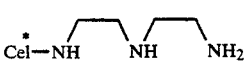 | 62.64 | 3.21 |
| 125 | 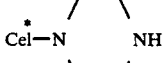 | 44.04 | 3.33 |

*Cel = cellulose

EXAMPLES 126-130

In each run, an aminated cellulose membrane was immersed at 30° C. for 13 hours in 200 g of a 50:50 by weight mixture of ethanol and water containing sulfuric acid in a concentration of $1.5 \times 10^{-3}$ mole/kg to obtain an ionized cellulose derivative salt membrane. The membrane was set in the same pervaporation apparatus as in Example 1. A 50:50 by weight mixture of water and ethanol was charged at 60° C. and separated by pervaporation under 0.3 mmHg. The properties of the membrane measured 6 hours after the start of pervaporation are shown in Table 22.

TABLE 22

| Example | Aminated cellulose membrane | Separation factor | Permeation rate (kg/m² · hr) |
|---|---|---|---|
| 126 | 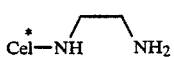 | 11.15 | 3.96 |
| 127 | 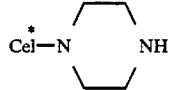 | 10.76 | 4.83 |
| 128 |  | 94.41 | 3.74 |
| 129 |  | 10.05 | 3.98 |
| 130 | 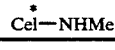 | 9.67 | 4.24 |

*Cel = cellulose

COMPARATIVE EXAMPLES 7-11

Examples 126 to 130 were repeated except that the aminated cellulose membrane were used without ionization in pervaporation. The results are shown in Table 23.

TABLE 23

| Comparative Example | Aminated cellulose membrane | Separation factor | Permeation rate (kg/m² · hr) |
|---|---|---|---|
| 7 | 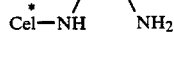 | 2.18 | 7.40 |
| 8 | 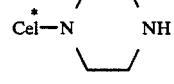 | 1.82 | 7.37 |
| 9 |  | 1.85 | 8.76 |
| 10 | Cel-NH₂ | 3.47 | 4.27 |
| 11 | Cel-NHMe | 3.03 | 4.65 |

*Cel = cellulose

EXAMPLE 131

Ninety-five parts by weight of 1 wt. % sodium alginate (a product of Nakarai Chemicals Ltd.; 300 cps) and 5 parts by weight of 1 wt. % polyvinyl alcohol (PVA 117, a product of Kuraray Co., Ltd.) were mixed. The mixture was cast onto a glass plate and spotaneously dried to form a PVA-blended sodium alginate membrane. The membrane was immersed overnight at 30° C. in a 50:50 by weight mixture of ethanol and water containing $CoSO_4$ (the amount of $Co^{2+}$ was 0.5 equivalent to the carboxyl groups of alginic acid) to crosslink the membrane with the cobalt ion. The membrane was immersed for 1 minute in a 93% by weight aqueous solution of ethanol, and then set in the same pervaporation apparatus as used in Example 1. A 93% by weight aqueous solution of ethanol at 60° C. was charged for 5 minutes, and the downstream side of the membrane was maintained at 0.3 mmHg to perform pervaporation. After 6 hours from the start of pervaporation, the membrane had a separation factor of 5030 and a permeation rate of 119 g/m².hr. The ratio of $Co^{2+}$ crosslinked in the membrane was 25.1 mole %.

EXAMPLE 132 AND COMPARATIVE EXAMPLE 12

The same sodium alginate membrane as used in Example 1 was immersed overnight at 30° C. in a 50:50 by weight mixture of ethanol and water containing cobalt sulfate (the amount of $Co^{2+}$ was 0.5 equivalent to the carboxyl groups of alginic acid) to crosslink it with a cobalt ion. The membrane was immersed for 1 minute in a 93% by weight aqueous solution of ethanol, and then set in the same pervaporation apparatus as used in Example 1. A 93% by weight aqueous solution of ethanol at 60° C. was charged for 5 minutes, and the downstream side of the apparatus was maintained at 0.3 mmHg to perform pervaporation. After 6 hours from the start of pervaporation, the membrane had a separation factor of 78700 and a permeation rate of 97 g/m².hr. After the lapse of 120 hours, the membrane had a separation factor of 51600 and a permeation rate of 53.8 g/m².hr which were 65.6% and 55.5%, respectively, based on the initial values. The ratio of $Co^{2+}$ crosslinked in the membrane was 25.8 mole %.

EXAMPLE 133

The same sodium alginate membrane as used in Example 1 was immersed overnight at 30° C. in a 50:50 by weight mixture of ethanol containing no ion. The membrane was then immersed in a 93% by weight aqueous solution of ethanol for 1 minute, and then set in the same pervaporation apparatus as used in Example 1. A 93% by weight aqueous solution of ethanol was charged for 5 minutes at 60° C., and the downstream side of the apparatus was evacuated to 0.3 mmHg to perform pervaporation. After 6 hours from the start of pervaporation, the membrane had a separation factor of 118800 and a permeation rate of 96.2 g/m².hr. After 120 hours, the membrane had a separation factor of 53800 and 40.3 g/m².hr which are respectively 45.3% and 41.9% of the initial values.

EXAMPLE 134

Pervaporation was carried out in the same way as in Example 133 except that the the membrane immersed overnight at 30° C. in a 50:50 by weight mixture of ethanol and water containing cobalt sulfate (the amount of $Co^{2+}$ was 5.0 equivalents to the carboxyl groups of alginic acid). After 6 hours from the start of pervaporation, the membrane had a separation factor of 2058 and a permeation rate of 90 g/m².hr. The ratio of $Co^{2+}$ crosslinked in the membrane was 100 mole %.

EXAMPLE 135

A 1% by weight aqueous solution of sodium alginate (a product of Nakarai Chemicals Ltd.; 1000 cps) was prepared, cast onto a glass plate, and spontaneously dried to form a homogeneous transparent sodium alginate membrane having a thickness of 10 microns.

The membrane was set in a pervaporation apparatus (available membrane area 7.0 cm$^2$), and dried while maintaining the downstream side of the membrane at 0.3 mmHg for 10 minutes by a vacuum pump. The water content of the membrane was measured by a Shimadzu electronic moisture meter (Model EB-280 MOC) and found to be 12% by weight. Then, a 90:10 by weight mixture of ethanol and water at 60° C. was charged into the apparatus, and the downstream side of the membrane was maintained at 0.3 mmHg to perform pervaporation. After 6 hours from the start of pervaporation, the membrane had a separation factor of 29880 and a permeation rate of 202 g/m$^2$.hr.

EXAMPLE 136

The same sodium alginate membrane as used in Example 1 was immersed in a 50:50 by weight mixture of ethanol and water at 30° C. for 13 hours. It was then immersed in a 90:10 by weight mixture of ethanol and water for 1 minute, and dehydrated. The water content of the membrane, measured by the water meter used in Example 135, was 14.5% by weight.

The membrane was set in the same pervaporation apparatus as used in Example 1. A 90:10 by weight mixture of ethanol and water was supplied to the upstream face of the membrane for 5 minutes, and the downstream face of the membrane was maintained at 0.3 mmHg to perform pervaporation. After 6 hours from the start of pervaporation, the membrane had a separation factor of 12900 and a permeation rate of 250 g/m$^2$.hr.

COMPARATIVE EXAMPLE 12

The same sodium alginate membrane as used in Example 1 was immersed in a 50:50 by weight mixture of ethanol and water at 30° C. for 13 hours, and without drying, set in the same pervaporation apparatus as used in Example 1. A 90:10 by weight mixture of ethanol and water at 60° C. was supplied to the upstream face of the membrane for 5 minutes, and the downstream face of the membrane was maintained at 0.3 mmHg to perform pervaporation. After 6 hours from the start of pervaporation, the membrane had a separation factor of 10.70 and a permeation rate of 510 g/m$^2$.hr.

COMPARATIVE EXAMPLE 13

The same sodium alginate membrane as used in Example 1 was immersed in a 50:50 by weight mixture of ethanol and water at 30° C. for 13 hours, and then allowed to cool in air. The membrane had a water content of 30.5% by weight. Using the resulting membrane, pervaporation was carried out in the same way as in Comparative Example 12. After 6 hours from the start of pervaporation, the membrane had a separation factor of 432 and a permeation rate of 314 g/m$^2$.hr.

What is claimed is:

1. A separating method, which comprises feeding a water-organic liquid mixture or an organic liquid-organic liquid mixture to be separated into an upstream side of two chambers partitioned by a separation membrane for pervaporation while reducing the pressure, or maintaining a low vapor pressure, in the downstream chamber to thereby cause a component of the mixture having a higher affinity for the membrane to preferentially permeate through the membrane in the vapor phase, said membrane being composed of a polymeric substance having in the main chain a glycosidic skeleton containing ammonium groups at least some of which are in the form of a salt with acids or groups having a nitrogen atom coordinated with polyvalent metal ions, and/or acidic groups which are in the form of salts with bases at least some of which are polyvalent metal salts.

2. The method of claim 1 wherein the glycosidic skeleton contains an acidic group and the acidic group is at least one group selected from sulfuric acid ester group, a sulfonic acid group, a carboxylic acid group, phosphoric acid ester group and a phosphonic acid group.

3. The method of claim 1 wherein the polymeric substance is a salt of alginic acid or a salt of an alginic acid derivative.

4. The method of claim 1 wherein the polymeric substance is a salt of an anionic cellulose derivative.

5. The method of claim 1 wherein the glycosidic skeleton contains ammonium groups which are derived from at least one type of group selected from primary, secondary and tertiary amino groups.

6. The method of claim 1 wherein the polymeric substance is a salt of chitosan or a salt of a chitosan derivative.

7. The method of claim 1 wherein the polymeric substance is a salt of a cationic cellulose derivative.

8. The method of claim 1 wherein the glycosidic skeleton contains acidic groups and 9 and 70 mole % of the acidic groups are neutralized with inorganic polyvalent metal compounds whereby the glycosidic skeleton is crosslinked.

9. The method of claim 8 wherein the polyvalent metal compounds are those of at least one type of metal selected from alkaline earth metals, transition metals and metals of Group IIIB and IVB of the periodic table.

* * * * *